United States Patent Office 2,967,192
Patented Jan. 3, 1961

2,967,192

LUBRICANT COMPOSITION

Simon W. Kantor, Schenectady, N.Y., assignor to General Electric Company, a corporation of New York No Drawing. Filed May 13, 1958, Ser. No. 734,814

2 Claims. (Cl. 260—448.2)

This invention relates to lubricating fluids. More particularly, this invention relates to organosilicon fluids having lubricating properties superior to the lubricating properties of conventional organosilicon fluids.

Organosilicon fluids or silicone oils have long been recognized as desirable materials for lubricating applications since the silicone oils exhibit thermal stability superior to the thermal stability of conventional hydrocarbon lubricating materials and in addition are satisfactory as lubricants over wide ranges of temperatures. Despite the recognized advantages of silicone oils in lubricating applications there have also been several recognized disadvantages of these materials. The main disadvantage of these materials has been in their lubricating properties which have not been as good as desired, particularly for extreme pressure lubricating requirements. The conventional silicone fluids comprise a siloxane chain with a number of silicon-bonded organic groups such as alkyl groups or aryl groups, more particularly methyl or phenyl groups. In an attempt to improve the lubricating properties of these methyl silicones or phenyl silicones or methylphenyl silicones, it has been proposed to modify the organic groups. Thus, one very useful silicone fluid is a fluid in which the organic groups are methyl and halogenated phenyl groups such as tetrachlorophenyl groups. Although the incorporation of tetrachlorophenyl groups in silicone fluids has served to increase markedly the lubricity of the silicone fluids, nevertheless, the properties are still not the optimum properties desired.

Another method of improving the lubricity of silicone oils has been to provide additives for the oil. Notable success has been employed in the use of additives for silicone oils as lubricity improvers, but the use of additives has resulted in products which are more complicated than usually desired.

I have now discovered a new class of silicone fluids with improved lubricity over prior art materials which are easily prepared and which do not require the use of additives. These new compositions of improved lubricating properties comprise an organopolysiloxane fluid in which at least some of the organo groups are silicon-bonded (1) 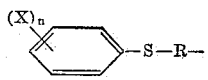

where X is halogen, e.g., fluorine, chlorine, bromine, or iodine, R represents an alkylene radical containing at least two carbon atoms with at least two carbon atoms between the sulfur atom and the silicon atom, e.g., ethylene, propylene, isopropylene, butylene, etc. radicals, and $n$ is an integer equal to from 1 to 4, inclusive, with any remaining organic groups being selected from the class consisting of monovalent hydrocarbon radicals free of aliphatic unsaturation and halogenated monova'ent hydrocarbon radicals free of aliphatic unsaturation. A particularly important group of silicone fluids within the scope of the present invention are those having the average composition represented by the following formula:

(2) 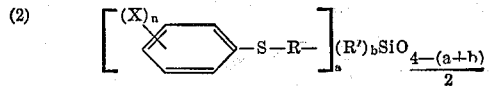

where X, $n$ and R are as previously defined, $a$ has a value of from 0.1 to 2, and the sum of $a+b$ is at least 2, e.g., 2.001 to 2.4, and R′ represents members selected from the class consisting of monovalent hydrocarbon radicals free of aliphatic unsaturation and halogenated monovalent hydrocarbon radicals free of aliphatic unsaturation. Among the radicals which R′ represents include alkyl radicals, e.g., methyl, ethyl, propyl, butyl, octyl, octadecyl, etc. radicals; cycloalkyl radicals, e.g., cyclohexyl, cycloheptyl, etc. radicals; aryl radials, e.g., phenyl, naphthyl, diphenyl, tolyl, xylyl, ethylphenyl, etc. radicals; aralkyl radicals, e.g., benzyl, phenylethyl, etc. radicals; and halogenated radicals, e.g., chloromethyl, β-chloroethyl, dibromophenyl, chlorophenyl, etc. radicals. In the preferred embodiment of my invention X is chlorine, $n$ is 1, R is ethylene, and R′ is methyl. For convenience the radical defined by Formula 1 above will be referred to sometimes hereinafter as the "halophenyl thioether" radical and the polysiloxane defined by Formula 2 above will be referred to sometimes hereinafter as the "halophenyl thioether siloxane."

The halophenyl thioether siloxanes of the present invention can readily be formed by hydrolyzing in a conventional manner a hydrolyzab'e silane containing at least one silicon-bonded halophenyl thioether radical and at least one silicon-bonded hydrolyzable group with any remaining valences of silicon in said silane being satisfied by monovalent hydrocarbon radicals free of aliphatic unsaturation and halogenated monovalent hydrocarbon radicals free of aliphatic unsaturation. These hydrolyzable halophenyl thioether silanes may be hydrolyzed alone or with other hydrolyzable silanes. In particular, the halophenyl thioether siloxanes of the present invention may be prepared by hydrolyzing a silane having the formula (3) 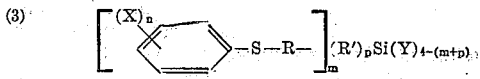

alone or in combination with one or more hydrolyzable silanes having the formula (4) 

where X, R, R′, and $n$ are as previously defined, $m$ has a value of from 1 to 3, $p$ has a value of from 1 to 3, the sum of $m+p$ is at most 3, and Y is a hydrolyzable group including, for example, halogen, e.g., chlorine, bromine, iodine; alkoxy radicals, e.g., ethoxy, propoxy, etc. radicals; and acyloxy radicals, e.g., acetoxy, etc. radicals. In the hydrolysis of the hydrolyzable silanes within the scope of Formulas 3 and 4, it is, of course, necessary to maintain the ratio of halophenyl thioether radicals and R′ radicals sufficient so that the total number of these radicals produces a silicone fluid. In particular, it is desirable to maintain the total number of these radicals at from about 2.001 to 2.4. It should, of course, be understood that the hydrolysis may be effected with a number of different hydrolyzable silanes within the scope of Formula 3 to produce halophenyl thioether siloxanes within the scope of Formula 2. In addition, one or more of the hydrolyzable silanes within the scope of Formula 3 may be cohydrolyzed with one or more hydrolyzable silanes within the scope of Formula 4 to produce the siloxanes of Formula 2. For example, β-(4-chlorothiophenyl)-ethyl methyldiethoxysilane can be hydrolyzed alone to form a siloxane within the scope of Formula 2. In addition, β-(4-chlorothiophenyl)-ethyl trichlorosilane, β-(4-chlorothiophenyl)-ethyl methyldiethoxysilane, dimethyldichlorosilane and trimethylchlorosilane can be co-hydrolyzed in the proper ratios to form a composition within the scope of Formula 2.

The halophenyl thioether radical containing hydrolyzable silanes of Formula 3 can be readily prepared by reacting a halophenyl mercaptan having the formula (5) 

where X and $n$ are as previously defined, across the double bond of a silane containing at least one silicon-bonded olefinically unsaturated hydrocarbon radical, and at least one silicon-bonded hydrolyzable group with any remaining valences of silicon being satisfied by hydrocarbon radicals free of aliphatic unsaturation or by halogenated hydrocarbon radicals free of aliphatic unsaturation. These silanes are best described by the following formula:

(6) $(\text{olefinic})_m(R')_p Si(Y)_{4-(m+p)}$ where $R'$, $Y$, $m$, $p$, and the sum of $m+p$ are as previously defined. In the reaction between the halophenyl mercaptan of Formula 5 and the unsaturated hydrolyzable silane of Formula 6 the halophenyl group becomes attached to the olefinic carbon atom farthest removed from the silicon atom and the hydrogen of the mercaptan becomes attached to the other olefinic carbon atom.

The halomercaptans within the scope of Formula 5 which are useful as starting materials in the practice of the present invention are well known compounds and include, for example, 2-chlorophenylmercaptan, 3-chlorophenylmercaptan, 4-chlorophenylmercaptan, the dichlorophenylmercaptans, the trichlorophenylmercaptans, the tetrachlorophenylmercaptans, 3-bromophenylmercaptan, 3,5-difluorophenylmercaptan, 3,4,5-triiodophenylmercaptan, etc.

The olefinically unsaturated hydrolyzable silanes within the scope of Formula 6 are also well known in the art and include such specific compounds as vinyltrichlorosilane, vinyltribromosilane, methylvinyldiethoxysilane, methylphenylvinylacetoxysilane, allyltrichlorosilane, diallyldichlorosilane, dimethylallylacetoxysilane, diphenylmethallylchlorosilane, trivinylmethoxysilane, styryltrichlorosilane, etc. The vinyl-substituted hydrolyzable silanes employed in the practice of the present invention may be prepared, for example, by the method shown in U.S. Patent 2,420,912—Hurd. Additional methods for the preparation of vinyl-substituted silanes, allyl-substituted silanes, and other silanes containing olefinically unsaturated hydrocarbon substituents are described in "An Introduction to the Chemistry of Silicones" by E. G. Rochow, John Wiley & Sons, Inc., New York, pages 55–60, Second Edition (1951). Among the numerous methods for the preparation of the olefinically unsaturated hydrolyzable silanes is the reaction of a halide of an olefin with heated silicon in the presence of a copper catalyst. Another method of the preparation of these olefinically substituted silanes is the chlorination of an alkyl-substituted silane with the subsequent dehydrochlorination of the chlorinated alkyl radical.

One particularly useful method for the preparation of the halophenyl thioether radical containing hydrolyzable silanes of Formula 3 is by the addition of the halophenyl mercaptan of Formula 5 to the olefinically unsaturated hydrolyzable silane of Formula 6 under the influence of ultraviolet light irradiation. In this method, the halophenyl mercaptan of Formula 5 and the olefinically unsaturated hydrolyzable silane of Formula 6 are merely mixed together in the desired proportions, heated to a temperature of around 30–75° C. and subjected to ultraviolet irradiation for from 1 to 3 hours, at the end of which time the halophenyl thioether radical containing hydrolyzable silane of Formula 3 is formed. This silane of Formula 3 may be readily separated from the reactants and other possible reaction products by fractional distillation. The proportions of the halophenyl mercaptan of Formula 5 and the olefinically unsaturated hydrolyzable silane of Formula 6 are generally selected so that there is one mercaptan group present per olefinic double bond in the reaction mixture.

The hydrolysis of one or more halophenyl thioether radical containing hydrolyzable silanes within the scope of Formula 3 with or without one or more hydrolyzable silanes within the scope of Formula 4 is carried out in a conventional manner. Thus, the hydrolyzable monomers are merely added to water, generally with the water in a two- to ten-fold volumetric excess and the hydrolysis is allowed to take place. Where the hydrolyzable groups of the various hydrolyzable silanes are chlorine atoms, it is generally desirable to carry out the hydrolysis by adding the hydrolyzable monomers to ice water so as to dissipate the heat generated during the hydrolysis. Where the hydrolyzable groups of the hydrolyzable silanes include both halogen atoms as well as alkoxy or acyloxy radicals, it is generally desirable to start the hydrolysis in cold water and subsequently heat the reaction mixture to the reflux temperature (about 100° C.) to complete the hydrolysis. Where all of the hydrolyzable groups are alkoxy or acyloxy radicals, the hydrolysis is preferably effected by pouring the hydrolyzable monomers into a volumetric excess of water which has been acidified, with subsequent refluxing of the mixture until the hydrolysis is completed. There are no critical requirements as to the acidity of the hydrolysis medium described above. Very satisfactory results have been obtained employing a 1 N HCl solution as the hydrolyzing medium for a material such as β-(4-chlorothiophenyl)-ethyl methyldiethoxysilane.

The following example is illustrative of the preparation and properties of the halophenyl thioether siloxanes within the scope of the present invention and is not intended for purposes of limitation.

*Example*

Equimolar amounts of methylvinyldiethoxysilane and 4-chlorophenyl mercaptan were mixed, heated to a temperature of about 60° C. and subjected to ultraviolet radiation for about 2 hours. At the end of this time the reaction mixture was fractionally distilled. This resulted in the isolation of β-(4-chlorothiophenyl)-ethyl methyldiethoxysilane having the formula (7) 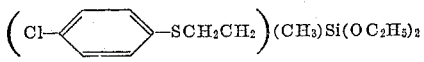

which had a boiling point of 144–148° C. at 0.5 mm. Chemical analysis of this material showed the presence of 50.6 percent carbon, 6.8 percent hydrogen, 9.5 percent silicon, 10.5 percent sulfur and 11.6 percent chlorine as compared with the theoretical values of 51.2 percent carbon, 6.9 percent hydrogen, 9.2 percent silicon, 10.5 percent sulfur, and 11.6 percent chlorine. Infrared analysis was consistent with the structure given above.

The β-(4-chlorothiophenyl)-ethyl methyldiethoxysilane prepared above was hydrolyzed by adding 153.3 grams of the silane to 300 ml. of a 1 N hydrochloric acid. The mixture was stirred and heated at reflux (approximately 90° C.) for 16 hours. At the end of this time the ethanol resulting from the hydrolysis and some water was fractionally distilled leaving a residue to which was added 100 grams of water. This was then refluxed, stirred for another hour, and cooled, resulting in an oily layer which was separated, washed thoroughly with 10 percent sodium carbonate solution, then washed with water and dried over anhydrous potassium carbonate. The oil was then filtered, redried over anhydrous potassium carbonate, treated with diatomaceous earth (Celite–270) and refiltered. The resulting clear oil had a light color and con- (8) 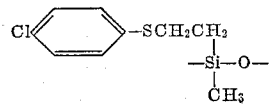

sisted essentially of recurring units. In terms of the type of general formula shown in Formula 2 this oil had the following average formula:

(9)
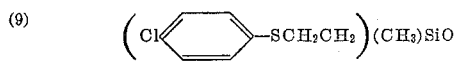

Infrared analysis was consistent with this structure. The molecular weight of this oil was 1475 which corresponds to an average of 6.3 of the units of Formula 8 per molecule. Chemical analysis of this oil showed the presence of 12.1 percent silicon, 13.6 percent sulfur, 15.3 percent chlorine, 46.8 percent carbon and 5.1 percent hydrogen as compared with the theoretical values of 12.1 percent silicon, 13.8 percent sulfur, 15.2 percent chlorine, 46.4 percent carbon, and 5.6 percent hydrogen.

The oil described above was evaluated by comparing its lubricating performance with the performance of other silicone oils in a Shell Four Ball Wear Tester which is a device for holding three rigidly clamped ½ inch metal balls submerged in a lubricant in a metal cup. A fourth rotating ball of the same diameter is then pressed into contact with the three stationary balls by an adjustable loading arm.

The load carrying ability of lubricating fluids is determined in this tester by bringing the tester to a temperature of either 212° F. or 400° F. with the lubricant under test in the metal cup. The rotatable ball is then rotated at 600 r.p.m. and the load on the rotatable ball is increased in 6 minute intervals at the rate of 5 kilograms per increase until the coefficient of friction shows a sudden increase. With steel balls in the tester, the lubricant of this example did not show a sudden increase in the coefficient of friction until a load of 140 kilograms had been applied at 212° F. and 120 kilograms had been applied at 400° F. As a comparison, silicone fluid consisting essentially of recurring methyl tetrachlorophenyl siloxane units and having a room temperature viscosity similar to the viscosity of applicant's fluid was given this same test. This methyl tetrachlorophenyl fluid showed a sudden increase in viscosity at a 40 kilogram load at 212° F. and a 32 kilogram load at 400° F. It is well known that the load carrying ability of this methyl tetrachlorophenyl oil is far superior to the load carrying ability of a conventional dimethyl silicone oil. Thus, this test showed the marked superiority of the load carrying ability of applicant's fluid to the load carrying ability of prior art materials.

A second lubricity test conducted in the Shell Four Ball Wear Tester is the "wear scar test" in which the lubricant in the metal cup is heated to the test temperature, which is either 212° F. or 400° F. and the rotatable ball is rotated at a speed of either 600 or 1200 r.p.m. The contact points between the rotatable ball and the three stationary balls grows to circular scars as wear progresses. The average diameter of these scars in millimeters after a one hour run or two hour run with a 40 kilogram load on the rotatable ball is taken as the measurement of wear. The better the lubricity of a fluid, the lower is the wear scar. In a two hour test at a temperature of 400° F., the chlorophenyl thioether siloxane of this example gave a wear scar of 0.63 mm. at 600 r.p.m. and a wear scar of 0.65 mm. at 1200 r.p.m. Comparative tests with the methyl tetrachlorophenyl silicone fluid described above produced a wear scar of 1.3 mm. at 600 r.p.m. and 2.6 mm. at 1200 r.p.m. In the above test all four balls were formed of steel. When the rotatable ball consisted of naval bronze the wear scar obtained with the chlorophenyl thioether siloxane of this example at 212° F. in a two hour test at 1200 r.p.m. with a 40 kilogram load was 0.79 mm. against a wear scar of 1.7 mm. obtained under the same conditions with the previously described methyl tetrachlorophenyl silicone fluid. With the four balls formed of steel a wear scar of 2.0 mm. was obtained with a conventional 200 centistoke methylsilicone oil in a one hour test at 212° F. with a 40 kilogram load at 600 r.p.m. The foregoing data show the marked lubricating superiority of the halophenylthioether siloxanes of the present invention as compared with conventional silicone fluids. The viscosity of the chlorophenyl thioether siloxane of the example was measured at 100° F. and 210° F. and found to be 267 and 17.8 centistokes, respectively.

To compare the lubricity properties of the chlorophenyl thioether siloxanes of the present invention with similar siloxanes, a siloxane was formed which differed from the siloxanes of the present invention only by the absence of the halogen groups in the aromatic nucleus. Specifically, β-thiophenyl-ethyl methyldiethoxysiloxane was formed by mixing phenyl mercaptan and methylvinyldiethoxysilane and irradiating the mixture with ultraviolet light at a temperature of 25–70° C. for about 2 hours with isolation of the desired product by fractional distillation. This product was hydrolyzed in the manner described in the example to form a siloxane containing the following recurring structural unit and having a viscosity similar to the viscosity of the chlorophenyl thioether fluid of the example.

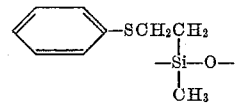

In a wear scar test with steel balls, a 40 kilogram load and a temperature of 400° F. this fluid exhibited a wear scar in a one hour test of 1.1 mm. at 600 r.p.m. and 1.40 mm. at 1200 r.p.m. This illustrates the superiority of the fluids of the present invention over fluids which differ only by the absence of the chlorine group in the phenyl nucleus.

Although the utility of the halophenyl thioether siloxanes of the present invention has been described only in terms of the use of these fluids per se as lubricants, it should also be understood that these fluids are useful as additives for modifying the properties of other silicone fluids. In addition, the fluids of the present invention are particularly useful in vibration damping applications, as heat transfer media, and as substitutes for hydraulic fluids.

What I claim as new and desire to secure by Letters Patent of the United States is:

1. An organopolysiloxane lubricating fluid having the average formula

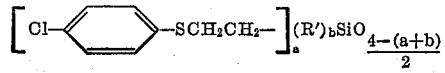

where R' is a member selected from the class consisting of monovalent hydrocarbon radicals free of aliphatic unsaturation and halogenated monovalent hydrocarbons free of aliphatic unsaturation, and $a$ has a value of from 0.1 to 2.0, inclusive, the sum of $a+b$ is equal to from 2.0 to 2.4.

2. An organopolysiloxane lubricating fluid consisting essentially of the following recurring structural units

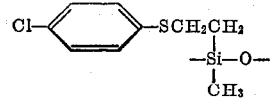

References Cited in the file of this patent
UNITED STATES PATENTS

| | | |
|---|---|---|
| 2,716,129 | Wilcock et al. | Aug. 23, 1955 |
| 2,719,165 | Cooper | Sept. 27, 1955 |
| 2,835,690 | Prober | May 20, 1958 |
| 2,863,898 | Merker | Dec. 9, 1958 |

FOREIGN PATENTS

| | | |
|---|---|---|
| 706,703 | Great Britain | Apr. 7, 1954 |

OTHER REFERENCES

Overberger et al.: Journal Organic Chemistry, volume 21, November 1956, pages 1311–1312.